United States Patent Office 3,632,843
Patented Jan. 4, 1972

3,632,843
BIS(PERFLUOROALKYLSULFONYL)METHANES IN CATIONIC POLYMERIZATION
Michael George Allen, Hudson, Wis., and George W. Beebe, Roseville, Minn., assignors to Minnesota Mining and Manufacturing Company, St. Paul, Minn.
No Drawing. Filed Mar. 14, 1969, Ser. No. 807,409
Int. Cl. C08g 23/14, 30/10
U.S. Cl. 260—2 EC   14 Claims

ABSTRACT OF THE DISCLOSURE

Bis(perfluoroalkylsulfonyl)methanes in active or latent form (as free acids or latent amino or ammonium salts or as clathrates) are used as catalysts in the curing or polymerization of cationic sensitive monomers, such as epoxides, vinyl ethers, N-vinyl compounds, aziridines, and acetals.

FIELD OF INVENTION

This invention relates to the curing of cationic sensitive monomers, such as epoxides which can be used, for example, as adhesives, impregnants, potting resins, etc. In another aspect, it relates to a process for catalyzing the curing of such monomers with a new catalyst therefor, and to the cured products produced thereby. In another aspect, it relates to mixtures of such monomers and catalysts for the curing thereof. In a further aspect, it relates to the curing of such monomers with latent catalysts which are activated by heat or other means.

BACKGROUND OF THE PRIOR ART

The curing of cationic sensitive monomers with acid catalysts is well known in the art. For example, epoxides can be cured with boron trifluoride and complexes thereof; styrene can be polymerized with aluminum trichloride; and 1,4 - diazabicyclo[2.2.2]octane can be polymerized with benzene sulfonic acid. While the curing of such monomers with such catalysts has been found to be advantageous in many cases, the use of some acid catalysts is often objectionable because such catalysts are highly corrosive to various substrates, such as metals. Other acid catalysts are objectionable because of their moisture sensitivity, their use requiring pre-drying of material and special handling and storing techniques to exclude moisture, while other such catalysts are objectionable because of their volatility. Further, many of these acid catalysts rapidly catalyze the polymerization of the monomers with which they are admixed and cannot be used where a definite or prolonged shelf life and/or pot life is desired or required. Though some of these prior art acid catalysts can be used in a latent form, e.g. $BF_3 \cdot NH_2C_2H_5$, their latency is affected by moisture and prolonged latency is difficult to achieve; in addition, when these latent catalysts are activated, this gives rise to the aforementioned objectionable corrosiveness.

This invention provides a novel class of catalysts for the curing of catinic sensitive monomers. These catalysts, though acids in their free form, are only slightly corrosive and they can be used in latent forms which permit admixture with the monomers to provide latently curable compositions having desirable shelf or pot life.

DESCRIPTION OF THE INVENTION

The novel class of curing catalysts of this invention are bis(perfluoroalkylsulfonyl)methanes, which preferably have the general formula:

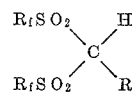

I where $R_f$ is perfluoroalkyl having, for example, 1 to 18 carbons and preferbaly 1 to 8 carbons, R is H, Br, Cl, alkyl having, for example, 1 to 19 carbons and preferably 1 to 8 carbons, aryl such as phenyl, alkaryl such as benzyl, or R can be R'—Y where R' is an alkylene linking group having, for example, 1 to 12 carbons and is preferably methylene or ethylene, and Y is a substituent group such as —OH, —CH=CH$_2$, —COOH, Br, Cl,

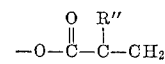

where R" is H or —CH$_3$, which substituent group has little or no effect under the conditions of use of these compounds as curing catalysts.

(For purposes of brevity, the bis(perfluoroalkylsulfonyl)methanes described herein are occasionally referred to as disulfonyl methanes.)

The bis(perfluoroalkylsulfonyl)methanes described above are non-corrosive or practically non-corrosive towards metals, which is in sharp contrast to the commonly used cationic catalysts, such as protonic and Lewis acids, which are highly corrosive to metals. Further, the catalysts of this invention generally are low melting solids or liquids and have high solubility in common solvents, such as chloroform, dichloromethane, methanol, ether, water, and other polar solvents, and are also soluble in many of the polymerizable cationic sensitive monomers. For example, $(CF_3SO_2)_2CH_2$ will form a 50% weight in volume solution in methylene chloride and is readily soluble in propylene oxide, epoxides such as cycloaliphatic epoxides and aliphatic or aromatic glycidyl ethers, as well as vinyl ethers such as hydroxylbutylvinyl ether, N-vinyl compounds, such as N-vinyl pyrrolidone, etc. In contrast to such acid catalysts as HCl and BF$_3$, the disulfonyl methanes are relatively non-volatile and thus are capable of maintaining an essentially constant catalyst concentration in those curing applications that require heating. They are also essentially moisture insensitive, thus allowing the polymerization of monomers without a prior drying procedure and without elaborate precautions to exclude moisture.

The simplest member of the new class of catalysts of this invention, $(CF_3SO_2)_2CH_2$, is described by Gramstad and Hazeldine in J. Chem. Soc. 4069 (1957) and by Brice and Trott in U.S. Pat. No. 2,732,398. Higher perfluoroalkyl homologs are described by Heine in U.S. Pat. No. 3,281,472. The two $R_f$'s in the disulfonyl methane can be the same or different. For example, the catalyst can be $C_8F_{17}SO_2$—$CH_2$—$SO_2CF_3$, which can be prepared by reacting $C_8F_{17}SO_2F$ with $ClMgCH_2SO_2CF_3$ Grignard reagent. Various substituted bis(perfluoroalkylsulfonyl) methanes, where R is R'—Y in above Formula I, and their preparation are described in copending application (FN 25,974) filed concurrently herewith by Koshar. Koshar's disclosed process can also be used to prepare disulfonyl methanes such as $(R_fSO_2)_2CHAr$ and $$(R_fSO_2)_2CH—CH_2Ar$$

(where Ar is an aryl, such as phenyl) by reacting the corresponding perfluoroalkylsulfonyl fluoride with benzyl magnesium halide or by reacting the Grignard of the bis (perfluoroalkylsulfonyl)methane with benzyl halide.

Where a latently curable composition is desired or required, the bis(perfluoroalkylsulfonyl)methanes have the advantage of being usable is latent forms, as amino or ammonium salts or clathrates. (The term "latent catalyst" as used herein means a catalyst which does not exhibit or manifest any substantial curing or catalytic effect on monomer admixed therewith during normal storage or handling of such mixtures until the mixture is subjected to some activation for the purpose of "de-latenizing" or generating the free disulfonyl methane, though some small or otherwise tolerable or insignificant curing of the monomer may take place before activation, as evidenced by a slight increase in viscosity.) The latent salts can be represented by the general formula:

where $R_f$ and R are as defined above in general Formula I, and X is an amino or ammonium cation having a valence equal to $y$.

The amino and ammonium salts can be formed by neutralization of the disulfonyl methanes with a salt-forming primary, secondary, or tertiary amine, ammonia, or a quaternary ammonium hydroxide. The salt-forming amines include alkyl amines such as methylamine, ethylamine, dimethylamine, diisopropylamine, trimethylamine, triethylamine, triisopropylamine, triisobutylamine, cyclohexylamine and the like; hydroxy amines such as monoethanolamine, diethanolamine, triethanolamine, monoisopropanolamine, diisopropanolamine, triisopropanolamine, and the like; heterocyclic amines such as morpholine, pyridine, piperidine, and the like; guanidine; aromatic amines such as aniline, and the like; and quaternary ammonium hydroxides such as tetramethylammonium hydroxide, tetraethylammonium hydroxide, trimethylhydroxyethylammonium hydroxide, tetrahydroxyethylammonium hydroxide, benzyltrimethylammonium hydroxide, and the like. These latent forms of the disulfonyl methane catalysts can be activated or "de-latentized" by heating them in the presence of the cationic sensitive monomers to generate the disulfonyl methane in its free acid form to make it available for curing, or such latent salts can be activated by means of an accelerator, such as an isocyanate in the case of the primary or secondary amine salts.

As mentioned, the disulfonyl methanes can also be used in the practice of this invention in the latent form as clathrates. An excellent review of clathrate compounds and their preparation and use is found in "Clathrate Inclusion Compounds," by Sister Martinette Hagen, published by Reinhold Publishing Corp., New York, (1962). Particularly useful host compounds which can be used to form clathrates of the disulfonyl methane catalysts of this invention (the "guest" component of the clathrate compound) is Dianin's compound, viz

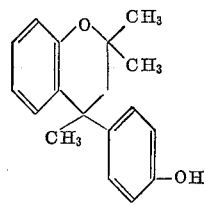

The clathrate of the disulfonyl methanes (in the acid or non-salt form) can be prepared by mixing the host compound (e.g. Dianin's compound), for example as a melt or in solution, with the disulfonyl methane, then crystallizing out the clathrate and washing it. By heating to melting the clathrate in the presence of the cationic monomer mixed therewith, or by adding a solvent for the host compound (e.g., acetone in the case of Dianin's compound), the active disulfonyl methane is released or liberated and it effects the curing of the monomer.

The monomers that can be cured or polymerized with the disulfonyl methane catalyst of this invention, using the latter in its active or latent forms, are those known to undergo cationic polymerization and contain a hetero oxygen or nitrogen atom attached to one of the carbon atoms of a carbon-carbon double bond (i.e. ethylenic unsaturation), e.g. monomers that contain the structure

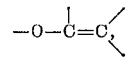

or monomers which polymerize by ring opening of cyclic groups containing hetero O or N ring atoms. By way of contrast, ethylenically unsaturated hydrocarbons, such as isobutylene, vinylbenzene, divinylbenzene, di-isopropenylbenzene, and tri-isopropenylbenzene cannot be cured with the disulfonyl methane catalyst of this invention.

One useful class of cationic sensitive monomers can be represented by the general formula:

where X is —O— or —NR'— (where R' is hydrogen or lower alkyl), R is hydrocarbyl, halohydrocarbyl, or hydroxyhydrocarbyl when X is oxygen, or R is hydrocarbyl, hydrocarbylcarbonyl, or hydrocarbylsulfonyl when X is nitrogen, and Y is hydrogen, alkyl, aryl, or other hydrocarbyl, or R (as hydrocarbylcarbonyl) and R' can be connected to form a 5 or 6-membered cyclic structure containing nitrogen as a hetero ring atom. The term "hydrocarbyl" is used herein in its usual sense to mean alkyl, alkenyl, aryl, cycloalkyl, cycloalkenyl, alkaryl, arylalkyl, and the like.

In general, monomers of this type contain a vinyl group and are typified by vinyl alkyl ethers, such as vinyl methyl ether, vinyl ethyl ether, vinyl n-butyl ether, vinyl 2-chloroethyl ether, vinyl isobutyl ether, vinyl phenyl ether and vinyl 2-ethylhexyl ether, vinyl ethers of substituted aliphatic alcohols, such as ω-hydroxybutyl vinyl ether, and N-vinyl compounds such as N-vinyl pyrrolidone, N-vinyl-N-methyl methanesulfonamide, and N-vinyl-N-methyl octanesulfonamide. A description of vinyl monomers and their use in preparing polymers is set forth in "Vinyl and Related Polymers," by Schildknecht, published by John Wiley Sons, Inc., New York (1952).

Cationic sensitive monomers which polymerize by ring opening of O-heterocyclic groups and which can be used in the practice of this invention are those which typically contain one or more epoxy groups, which has the structure

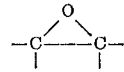

Such monomers, broadly called epoxides, include epoxy compounds and epoxides of the polymeric type and can be aliphatic, cycloaliphatic, aromatic or heterocyclic and will typically have an epoxy equivalency (i.e. the number of epoxy groups contained in the average molecule) of from 1.0 to 6.0, preferably 1 to 3, this value being the average molecular weight of the epoxide divided by the epoxide equivalent weight. Such epoxide monomers are well-known and include such epoxide as epichlorohydrins, e.g. epichlorohydrin, alkylene oxides, e.g. propylene oxide, styrene oxide, alkenyl oxides, e.g. butadiene oxide, glycidyl esters, e.g. ethyl glycidate, glycidyl-type epoxy resins, e.g. the diglycidyl ethers of Bisphenol-A and of novolak resins, such as described in "Handbook of Epoxy Resins," by Lee and Neville, McGraw-Hill Book Co., New York (1967).

Particularly useful epoxides which can be used in this invention are those which contain one or more cycloaliphatic epoxide groups such as the epoxycyclohexanecarboxylates, typified by 3,4 - epoxycyclohexyl-ethyl 3,4-epoxycyclohexanecarboxylate, 3,4 - epoxy-2-methylcyclohexylmethyl, 3,4 - epoxy - 2 - methylcyclohexanecarboxylate, and bis(3,4-epoxy-6-methylcyclohexylmethyl) adipate. For a more detailed list of cycloaliphatic epoxides of this nature, reference is made to U.S. Pat. No. 3,117,099.

Further epoxides which are particularly useful in the practice of this invention include glycidyl ether monomers of the formula

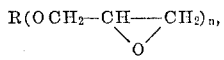

where R is alkyl or aryl and $n$ is an integer of 1 to 6. An example is the glycidyl ethers of polyhydric phenols obtained by reacting a polyhydric phenol with an excess of chlorohydrin, such as epichlorohydrin, e.g. the diglycidyl ether of Bisphenol-A. Further examples of epoxides of this type which can be used in the practice of this invention are described in U.S. Pat. No. 3,081,262.

Other cationic sensitive monomers which can be polymerized in the practice of this invention include those which polymerize by ring opening of N-heterocyclic groups, which have the structure

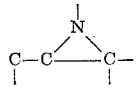

Such monomers, include those having the structures

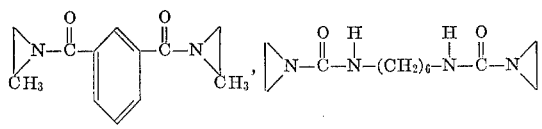

and

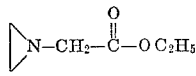

Another useful class of monomers which can be used are the acetals, such as trioxane.

There are a host of commercially available cationic sensitive monomers which can be used in this invention. In particular, epoxides which are readily available include propylene oxide, epichlorohydrin, styrene oxide, vinyl cyclohexene oxide, glycidol, glycidyl methacrylate, diglycidyl ether of Bisphenol-A, vinylcyclohexene dioxide, 3,4-epoxycyclohexylmethyl - 3,4-epoxycyclohexane carboxylate, 3,4 - epoxy - 6-methylcyclohexylmethyl-3,4-epoxy-6-methylcyclohexylmethyl - 3,4-epoxy-6-methylcyclohexane carboxylate, bis(3,4 - epoxy - 6-methylcyclohexylmethyl) adipate, bis(2,3 - epoxycyclopentyl)ether, aliphatic epoxy modified with polypropylene glycol, dipentene dioxide, epoxidized polybutadiene, silicone epoxy, 1,4-butanediol diglycidyl ether, polyglycidyl ether or phenolformaldehyde novolak, and resorcinol diglycidyl ether.

The polymerization or curing of cationic sensitive monomers in the presence of a catalytic amount (e.g., 0.1 to 5 wt. percent, preferably 0.1 to 2 wt. percent, based on the weight of monomers) of the disulfonylmethane catalysts can be carried out by simply mixing the monomeric material with the disulfonyl methane, in its active or non-latent form and allowing the curing to take place at room temperature or at an elevated temperature sufficient to melt the monomer or to accelerate the curing if desired or necessary.

As mentioned above, the disulfonyl methanes have high solubility in common solvents as well as in a wide variety of polymerizable monomers, which property makes it convenient to mix the catalyst with the monomers to obtain a homogeneous mixture. Solvents which can be used for the polymerization representatively include polar solvents such as acetone and chlorinated hydrocarbons such as chloroform and dichloromethane. In some cases, it will be desirable to mix the monomer with a solution of the disulfonyl catalyst.

In general, the polymerization can be carried out at room temperature (or as low as 0° C. in some cases) in the case of the non-latent catalysts, though elevated temperatures, e.g. 30 to 200° C., preferably 50 to 100° C., can be used to accelerate the cure. In the case of latent catalysts, temperatures generally in the range of 50 to 250° C., preferably from 80 to 150° C., can be used. The particular amount of catalyst to be used and temperature of polymerization will vary, of course, and be dependent on the particular monomers used and the particular catalyst used, as well as the particular application to be made.

In the case where the disulfonyl methane catalyst is used in its latent form as an amino or ammonium salt, storage stable mixtures of the monomer and latent catalyst can be made up as one-component latently curable mixtures and applied or shaped, and then the applied or shaped mixture activated to release the disulfonyl methane in its acid form and cause polymerization of the monomers. In the case of the amino salts or clathrates, such activation can be accomplished by heating the latent catalyst (admixed, of course, with the cationic sensitive monomer) to generate or liberate the disulfonyl methane acid, or by adding an accelerator which reacts with the salt or the amine which is in equilibrium therewith. Accelerators which can be used for this purpose presentatively include mono- and polyisocyanates and isocyanates prepolymers, acids such as hydrochloric acid and trifluoroacetic acid, and ketenes such as dimethylketene. Such accelerators can also be used in latent forms which are also delatinized upon heating, such as blocked isocyanates. Blocked or hindered isocyanates are well-known [e.g., see U.S. Pat. No. 3,115,479 and "Polyurethanes-Chemistry & Technology," by Saunders and Frisch, Interscience Publishers (1964)] and are generally formed by forming an adduct of an isocyanate (i.e. a mono- or polyisocyanate or isocyanate prepolymer) with a blocking compound, such as a monohydroxy compound, e.g. phenols, aliphatic and aromatic alcohols, secondary aromatic amines, acetoacetate esters and other compound which contain evolizable hydrogen. These adducts when heated, e.g. to 140° C. or higher, dissociate into the starting materials, thus releasing the isocyanate to enable it to enter into reactions. As used herein, the released isocyanate reacts with amino salts of disulfonyl methanes and in effect delatenizes such salts, releasing the disulfonyl methane in its active acid form to enable it to effect the curing of the cationic sensitive monomer admixed with such salt and with the blocked isocyanate to form a storage stable, latently curable one-component mixture. The amount of accelerator to be used will vary with the particular one used and with the particular disulfonyl methane salt and monomeric material to be cured. Generally, the accelerator will be in amounts of 0.25 to 10, preferably 1 to 4 times by weight based on the weight of latent salt catalyst.

Particularly useful blocked isocyanates which can be used as accelerators are phenyl carbanilates, such as those of the general formula

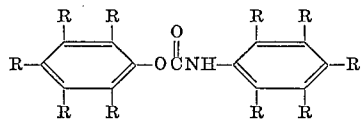

where R is hydrogen, lower alkyl, chloro, nitro, cyano, methoxy, or other electron-withdrawing group. One of the R's can also be a phenyl carbonyloxy group, the phenyl ring of which can be similarly substituted with lower alkyl or electron-withdrawing groups. Representative phenyl carbanilates which can be used include m-nitrophenylcarbamoyloxybenzene, p-nitrophenylcarbamoyloxybenzene, p - methoxyphenylcarbamoyloxybenzene, 1-(m-chlorophenylcarbamoyloxy) - 4 - acetylbenzene, 1-(p-chlorophenylcarbamoyloxy)-4-acetylbenzene, and the like, including those shown in the working examples below.

Where the disulfonyl methanes are used in the latent form as salts of tertiary amines or quaternary ammonium hydroxides, activation can be accomplished by heating or adding accelerators such as esters of strong acids which decompose on heating to generate a non-catalytic acid that competes with the latent salt for the amine, thus in turn liberating a catalytic concentration of free disulfonyl methane.

The compositions of this invention, comprising the cationic monomer and disulfonyl methane catalyst, can be used for applications like those cationic monomer systems cured with other catalysts, such as epoxides cured with $BF_3$ or $BF_3 \cdot O(C_2H_5)_2$. For example, the compositions of this invention can be used as adhesives, caulking and sealing compounds, casting and molding compounds, potting and encapsulating compounds, impregating and coating compounds, etc., depending on the particular monomers and/or catalyst used. Where the disulfonyl methane catalyst is used in its latent form, the curable composition can be used as a one-component or cured-in-place system, such capability enhancing its use for the applications mentioned above. One particular application where such capability can be capitalized on is in the electrical area, where such latently curable composition can be used to coat or impregnate for insulation or protective purposes electrical motor windings or coils, transformers, capacitors, electrical terminals, cables, and other electrical devices.

The object and advantages of this invention are further illustrated by the following examples, but the particular materials and amounts thereof recited in these examples as well as other conditions and details should not be construed to unduly limit this invention.

EXAMPLE 1

To 3 grams each of the various cationic sensitive monomers shown in Table I was added, with stirring, 0.2 ml. of a solution of 15.0 g. of $(CF_3SO_2)_2CH_2$ catalyst dissolved in sufficient methylene chloride to give 30 ml. of solution. In each run, the apparent exotherm at room temperature was observed and noted, as was the physical state of the cured polymer and the time such physical state was observed after addition of the catalyst. In some runs, after observing the physical state at room temperature, the product was placed in an 80° C. oven to see what effect the elevated temperature had on the product.

TABLE I
Polymerization of various monomers with bis(perfluoromethylsulfonyl)methane

| Monomer | Observed ambient exotherm | Observed physical state of cured product | Time to reach observed physical state |
|---|---|---|---|
| 1,2-propylene oxide | None | Viscous liquid | 10 min. at RT. |
| Vinylcyclohexene dioxide (ERL-4206) | High | Hard brittle solid | <0.3 min. |
| 3,4-epoxycyclohexylmethyl-3,4-epoxycyclohexanecarboxylate (ERL-4221) | do | Hard solid | 0.2 min. |
| 3,4-epoxy-6-methylcyclohexylmethyl-3,4-epoxy-6-methylcyclohexanecarboxylate (ERL-4201) | do | do | 1 min. |
| Bis(3,4-epoxy-6-methylcyclohexylmethyl)adipate (ERL-4289) | do | Semi-flexible solid | 2 min. |
| Bis(2,3-epoxycyclopentyl)ether (ERL-0400) | Very high | Brittle solid | 0.9 min. |
| Aliphatic epoxy modified with polypropylene glycol (ERL-4050) [1] | High | Hard solid | 0.2 min. |
| Dipentene dioxide (ERL-4269) | do | Viscous liquid | Immediate. |
| Epichlorohydrin | None | do | 10 min. at 80° C. |
| Styrene oxide | Very high | do | Immediate. |
| Epoxidized polybutadiene (Oxiron 2001) | Very mild | Cheesy solid | 4 min. |
| Silicone epoxy (Syl-Kem 90) | None | Cheesy solid | 20 min. at RT. |
| | | do | 10 min. at 80° C. |
| Vinylcyclohexene monoxide | Very high | Viscous liquid | |
| 1,4-butanediol diglycidyl ether (Araldite RD-2) | do | Cheesy solid | 0.5 min. |
| Glycidol | do | Viscous liquid | Immediate. |
| Glycidyl methacrylate | None | Cheesy semi-solid | 15 min. at RT. |
| | | do | 10 min. at 80° C. |
| Diglycidyl ether of Bisphenol A (Epon 828) [2] | do | Viscous liquid | 15 min. at RT. |
| | | Hard solid | 5 min. at 80° C. |
| Polyglycidyl ether of phenolformaldehyde novolac (DEN 438) | do | Tough rubbery solid | 11 min. at RT. |
| | | Hard brittle solid | 23 min. at RT. |
| Polyglycidyl ether of phenolformaldehyde novolac (DEN 431) | do | Tack-free, flexible solid | 23 min. at RT. |
| | | Brittle solid | 43 min. at RT. |
| Resorcinol diglycidyl ether (Kopoxite 159) | Very high | Tough solid | 1.5 min. |
| Hydroxybutyl vinyl ether | High | Viscous liquid | Immediate. |
| 2-ethylhexyl vinyl ether | do | do | 1.5 min. |
| N-vinyl pyrrolidone | do | do | 0.3 min. |
| N-vinyl-N-methyl methanesulfonamide | Very high | Brittle solid | Immediate. |
| N-vinyl-N-methyl octanesulfonamide | do | Rubbery solid | Do. |
| Isophthaloyl-N,N'-bis(propyleneimine) [3] | (4) | (4) | (4). |
| 1,6-hexane-bis(1-aziridinecarboxamide) [5] | (4) | (4) | (4). |
| Trioxane | (6) | (6) | (6). |

[1] Same results obtained for similar modified epoxy ERL-4052.
[2] Same results obtained for similar diglycidyl ether DER-332.
[3] Monomer was used as a toluene solution.
[4] Immediate precipitate formed on addition of catalyst.
[5] Monomer used as methylene chloride solution.
[6] Catalyst added to melted trioxane and immediate reaction ensued (≅70° C.) to form white solid.

EXAMPLE 2

A series of catalyst solutions were prepared by dissolving 0.05 g. of the various bis(perfluoroalkylsulfonyl)methanes indicated in Table II in methylene chloride. Each solution was then added, with stirring, to separate 3.0 g. portions of ERL-4221 epoxy monomer contained in aluminum cups. The various polymerization characteristics are shown in Table II.

TABLE II

Polymerization of epoxy monomer with various bis(perfluoroalkylsulfonyl)methanes

| ($R_fSO_2$)$_2$CHR catalyst | | Cure time,[1] min. | Physical state of product at noted cure time |
|---|---|---|---|
| $R_f$ | R | | |
| Run: | | | |
| 1 | —$CF_3$ | —Cl | <0.1 | Hard brittle solid (with gel particles around catalyst). |
| 2 | —$CF_3$ | —$CH_2C_6H_5$ | 0.25 | Hard brittle solid. |
| 3 | —$CF_3$ | —$CH_2CH=CH_2$ | 0.25 | Do. |
| 4 | —$CF_3$ | —$CH_2CH(Br)C_6H_{13}$ | 0.2 | Do. |
| 5 | —$CF_3$ | —$CH_2CH_2OH$ | 0.2 | Do. |
| 6 | —$CF_3$ | —$CH_3$ | 20 | Rubbery solid (gelled at 3.6 min.). |
| 7 | —$CF_3$ | —Br | <0.1 | Hard brittle solid (with gel particles around catalyst). |
| 8 | —$C_4F_9$ | —H | 10 | Hard brittle solid (gelled in 1 min.). |
| 9 | —$C_4F_9$ | —$C_6H_5$ | 0.2 | Hard brittle solid. |
| 10 | —$C_4F_9$ | —$CH_2CH_2OH$ | 0.2 | Do. |
| 11 | —$C_8F_{17}$ | —H | [2] 20 | Cheesy solid. |
| 12 | —$C_8F_{17}$ | —$CH_2CH=CH_2$ | [2] 3 | Hard brittle solid. |
| 13 [3] | —$C_8F_{17}$ and $CF_3$ | —H | [2] 6 | Do. |

[1] Cure times noted are those at room temp. except as indicated for Runs 11-13.
[2] In Runs 11-13, cure was carried out at 115° C. because catalyst was insoluble in monomer at room temp.
[3] One of the $R_f$'s was —$C_8F_{17}$ and the other was —$CF_3$.

EXAMPLE 3

Five grams of Epon 828 epoxy and 0.5 g. of $$(CF_3SO_2)_2CH_2$$

catalyst were mixed together in aluminum dish for one minute. The resulting clear solution was then placed in an oven at 83° C. In four minutes the solution began to gel and in seven minutes the cured material was a hard slightly-colored brittle solid.

EXAMPLE 4

To 3 g. of the same monomer used in Example 3 was added, with stirring, 0.2 ml. of a solution prepared by dissolving 15.0 g. of $(CF_3SO_2)_2CH_2$ in sufficient methylene chloride to give 30 ml. of solution. An aluminum-to-aluminum bond was made with the resulting solution in the standard fashion using Forest Product Laboratory etched Al-Clad aluminum panels and cured for two hours at 80° C. The resulting bond after standard Instron testing had an average overlap shear value of 1360 p.s.i.

EXAMPLE 5

As an illustration of the ability of bis(perfluoroalkylsulfonyl)methanes and derivatives to cure mixtures of aromatic glycidyl ethers, 2.5 g. of Epon 828 epoxy and 2.5 g. of DEN 438 epoxy were mixed together in an aluminum dish. To this solution was then added 0.2 ml. of a solution prepared by dissolving 2.5 g. of $$(CF_3SO_2)_2CH_2$$

in enough methylene chloride to give 5 ml. of solution. The resulting solution was placed in an 80° C. oven where the material gelled in 1.7 min. and was a hard brittle orange-colored solid after 5 minutes.

EXAMPLE 6

As an illustration of the ability of bis(perfluoroalkylsulfonyl)methanes to cure mixtures of aliphatic epoxides and aliphatic glycidyl ethers, a mixture of 2.5 g. of each of ERL-4289 epoxy and Araldite RD-2 epoxy was mixed with 0.05 ml. of a solution prepared by dissolving 2.5 g. of $(CF_3SO_2)_2CH_2$ in enough methylene chloride to give 5 ml. of solution. The solution gelled in 0.4 min. and then exothermed. After 2 min. at room temperature, it had become a flexible non-tacky solid.

EXAMPLE 7

As an illustration of the ability of bis(perfluoroalkylsulfonyl)methanes to cure mixtures of aliphatic and aromatic glycidyl ethers, 2.5 g. each of Epon 828 epoxy and Araldite RD-2 epoxy were mixed together in an aluminum dish. To this solution was added 0.10 ml. of a solution prepared by dissolving 2.5 g. of $(CF_3SO_2)_2CH_2$ in enough methylene chloride to give a 5 ml. of solution. The solution gelled in 2.15 min. and then exothermed. After 5 min. at room temperature the material was a hard, semi-flexible, non-tacky solid.

EXAMPLE 8

The rates of corrosion of iron and aluminum by $(CF_3SO_2)_2CH_2$, HCl, and $BF_3 \cdot O(C_2H_5)_2$ were determined by potentiostatic polarization curves in a static 0.5% NaCl solution with $10^{-3}$ M additions of the various catalysts at 23° C. Oxygen was not excluded. The metal specimens were pure iron (99.9% Fe) and 6061 aluminum alloy (97% Al). Results are shown below in Table III.

TABLE III

| | Corrosion rate (mils/yr.) | |
|---|---|---|
| Catalyst | Iron | Aluminum alloy |
| None | 16 | 0.5 |
| HCl | *77 | 2.1 |
| $BF_3 \cdot O(C_2H_5)_2$ | 98 | 33 |
| $(CF_3SO_2)_2CH_2$ | 44 | 1.8 |

*Average of three runs; all other results in Table III are averages for 2 runs.

The above data show that under similar conditions the use of disulfonyl methane catalyst resulted in significantly less corrosion on typical metal substrates than that which resulted when HCl and the boron trifluoride complex catalysts were used.

EXAMPLE 9

Dianin's compound (4.0 g.) was melted in an aluminum cup on a hot plate. Melted $(CF_3SO_2)_2CH_2$ (280 mg.) was then added. (This quantity of the disulfonyl methane corresponds to a calculated 50% filling based upon a ratio of 6 moles host/1 mole guest.) The resulting liquid was cooled slowly on top of an inverted aluminum beaker heated on a steam cone. After the material solidified it was added to 250 ml. of distilled water in a Waring Blendor and beat for 5 min. The clathrate was isolated by filtering and drying to give 3.12 g. of a white solid M.P. 155–157° C.

The quantity of clathrated disulfonyl methane acid was determined by dissolving a known quantity (~1 g.) in 25 ml. of acetone and then diluting with 50 ml. of water (the Dianin's compound precipitates at this point probably as the acetone clathrate). The liberated acid was titrated with standard base using bromthylmol blue indicator. This sample contained 0.109 mmoles of disulfonyl methane/gram clathrate. (Theoretical for 50% occupancy=0.33 mmole/gram).

EXAMPLE 10

Ten grams of Dianin's compound was dissolved with heating in 75 cc. of Decalin and to the hot clear solution was added 3.75 g. of $(CF_3SO_2)_2CH_2$. The solution was stoppered and allowed to cool slowly. The crystals which formed were collected and washed with Decalin and air dried. The solid was placed in a Waring Blendor with water and beat for 10 min. The solid was isolated by filtration and washed with water several times, then with about 1% $NaHCO_3$ solution, and finally with water until the filtrate was pH 6. Drying and sieving gave 10 g. of clathrate product with the following size distribution: passing #80, 100%; passing #120, 99% passing #200, 95%. Analysis as in Example 9 gave a filling level of 0.137 mmoles of disulfonyl methane/gram clathrate (about 20% filling).

EXAMPLE 11

Four grams of Dianin's compound was melted in an aluminum cup on top of a hot plate. $(CF_3SO_2)_2CHBr$ was then added and the resulting solution was allowed to cool and crystallize slowly. The resulting solid was beat in a Waring Blendor with approximately 200 ml. of water for 10 min. The clathrate product was isolated by filtering, washing and drying to give 3.88 g. of a white solid, M.P. 142–144° C. Titration indicated 0.17 mmole disulfonyl methane/gram clathrate.

EXAMPLE 12

135 mg. of the Dianin's clathrate of bis(perfluoromethylsulfonyl)methane was dispersed in 5 g. of DEN-438 epoxy. The resulting dispersion was then placed in a 150° C. oven and allowed to cure. After 3 min. the liquid was gelled; after 10 min. it was a cheesy, yellow solid, and after 1 hr. it was a hard, brittle solid. At ambient conditions this composition showed no sign of curing for at least 2 days.

EXAMPLE 13

To 100.0 g. (0.358 mole) of bis(perfluoromethylsulfonyl)methane in 200 ml. of diethyl ether was added, with stirring and ice bath cooling, 31.6 g. (0.364 mole) of morpholine in 50 ml. of ether. The resulting suspension was stirred at room temperature for 1 hr., cooled in an ice bath, filtered with suction, and the solid washed with several portions of cold ether. The resulting cream-white solid, the morpholine salt of the disulfonyl methane, after air drying amounted to 125.5 g. (95.7% of theory) and had a M.P. of 98–100° C.

EXAMPLE 14

Ten grams of ERL 4289 epoxy and the morpholine salt of bis(perfluoromethylsulfonyl)methane (0.10 g.) prepared in Example 13 were mixed together and stirred until dissolved. The resulting solution was cured in an oven for 9 hrs. at 80° C. and 1 hr. at 150° C. to give a hard, red-colored solid.

EXAMPLE 15

To a solution of 93.3 g. (0.33 mole) of bis(perfluoromethylsulfonyl)methane in 100 ml. of methanol was slowly added with stirring, 30.0 g. (0.165 mole) guanidine carbonate. The mixture was stirred for 1.5 hrs. and the pH checked and found to be 7–8. The cloudy solution was filtered and the filtrate evaporated on a rotary evaporator to give a viscous liquid which crystallized on standing overnight. The solid was dried by azeotroping with 75 ml. of benzene for approximately 2 hrs. Filtering and drying in a vac oven gave 110.0 g. of white solid product, guanidine salt of bis(perfluoromethylsulfonyl)methane, M.P. 112–114° C.

EXAMPLE 16

Using ERL-4201 epoxy as an example of aliphatic epoxy resin, the catalytic curing effect of morpholine salt of $(CF_3SO_2)_2CH_2$ prepared in Example 13, was determined as a function of curing temperature and catalyst concentration. Samples were prepared as noted in Table IV and V and small portions (2–5 g.) cured in a circulating air oven to hard brittle solid. The data of these tables show that the cure rate is a function of the cure temperature and the amount of latent catalyst used.

Table IV.—Effect of latent catalyst concentration on cure rate of epoxy resin

| Concentration of latent catalyst (phr) | Curing time, min., at 150° C. |
|---|---|
| 0.05 | 105 |
| 0.1 | 85 |
| 0.5 | 45 |
| 0.8 | 20 |
| 1.0 | 8 |
| 2.0 | 6 |
| 3.0 | 3 |

TABLE V

Effect of Cure Temperature on the Cure Rate of Epoxy Resin Catalyzed by Latent Catalyst

| Concentration of latent catalyst, phr. | Oven temperature, ° C. | Curing time, minutes |
|---|---|---|
| 4 | 110 | 25 |
| 4 | 120 | 20 |
| 4 | 130 | 15 |
| 4 | 140 | 10 |
| 4 | 150 | 2.5 |

EXAMPLE 17

The morpholine salt of bis(perfluoromethylsulfonyl)methane (0.06 g.) was dissolved in a mixture of ERL-4289 epoxy (5.0 g.) and glycidol (1.0 g.) contained in an aluminum cup. This solution was cured in an oven for 30 min. at 130° C. to give a hard, semi-flexible, red-colored solid.

EXAMPLE 18

Using methods similar to Example 13, several amine salts of $(CF_3SO_2)_2CH_2$ were prepared and used to cure ERL-4221 epoxy resin. Curing effectiveness of the salts compared to the $pK_b$ of the amine was determined by measuring gel times at various temperatures and salt concentrations. The results are shown in Table VI.

TABLE VI

Gel Times of ERL-4221 Using Various Amine Salts of $(CF_3SO_2)_2CH_2$ as Catalysts

| Amine salt of $(CF_3SO_2)_2CH_2$ | $pK_b$[1] of amine | Concentration of salt, phr. | Test temperature, ° C. | Gel time, min. |
|---|---|---|---|---|
| Pyridine | 8.77 | 3 | 150 | 0.85 |
|  |  | 1 | 150 | 1.7 |
|  |  | 1 | 130 | 1.6 |
|  |  | 1 | 100 | 2.7 |
| Benzylamine | 4.63 | 3 | 150 | 0.95 |
|  |  | 1 | 150 | 1.2 |
|  |  | 1 | 130 | 1.9 |
| Triethyl amine | 3.24 | 1 | 100 | 4.0 |
|  |  | 3 | 150 | 4.2 |
|  |  | 1 | 150 | 5.2 |
|  |  | 1 | 130 | 64.2 |
|  |  | 1 | 100 | 911.0 |
| Piperidine | 2.79 | 3 | 150 | 3.1 |
|  |  | 1 | 150 | 6.0 |
|  |  | 1 | 130 | 17.2 |
|  |  | 1 | 100 | 67.4 |
| Di-isopropyl amine | 1.95 | 3 | 150 | 3.4 |
|  |  | 1 | 150 | 5.45 |
|  |  | 1 | 130 | 30.3 |
|  |  | 1 | 100 | 349.2 |
| Guanidine |  | 3 | 150 | 19.1 |
|  |  | 1 | 150 | 45.3 |
|  |  | 1 | 130 | 146.7 |
|  |  | 1 | 120 | 289.8 |
|  |  | 1 | 100 | 1,177.0 |

[1] $pK_b$ values given are from Handbook of Chemistry and Physics, The Chemical Rubber Co., 45th ed., p. D-76, 1964.

These data show that, generally speaking, the salts of strong bases (low $pK_b$) give longer cure times but are more latent. The speed of cure disregarding latency and with all other variables constant can be regulated by varying the base strength of the amine used to form the latent salts of the disulfonyl methane.

EXAMPLE 19

To demonstrate the desirable accelerating effect of added isocyanate on the disulfonyl methane salt catalyst system, a stock solution of guanidine salt of bis(perfluoromethylsulfonyl)methane (0.5% by weight of resin) in ERL-4221 epoxy was prepared. To 5 g. portions of the solution was added the various amounts of phenyl isocyanate shown in Table VII. The sample were well mixed and then placed in a circulating air oven at 140° C. and the cure time determined.

TABLE VII

Effect of Added Isocyanate on the Cure Time of an Epoxy Catalyzed with the Guanidine Salt of $(CF_3SO_2)_2CH_2$

| Run: | Weight of added phenyl isocyanate, g. | Cure time at 140° C. and results |
|---|---|---|
| 1 | 0.01 | 20 minutes—no cure. |
| 2 | 0.02 | Do. |
| 3 | 0.035 | 5 minutes—soft crack cure, not tacky. |
| 4 | 0.05 | 5 minutes—hard brittle solid, not tacky. |
| 5 | 0.065 | Do. |
| 6 | 0.08 | Do. |

EXAMPLE 20

Epoxy curing composition were prepared by dissolving 2 phr. of the morpholine salt of $(CF_3SO_2)_2CH_2$ in ERL-4052 epoxy in a jar with aid of stainless steel milling tops. The sample was evacuated to remove entrained air and via $N_2$ pressure a portion of the sample was transferred to an aluminum mold and cured 3 hrs. at 140° C. Silicone mold release agent (RAM 225) was used. To the remainder of the sample, 2,4-tolylene diisocyanate (TDI) was added as an accelerator just prior to transfer to the mold and cured similarly. Sample composition and average tensile and elongation are shown below.

TABLE VIII

| Concentration TDI, phr. | Average tensile, p.s.i. | Average percent elongation at break | Pot life |
|---|---|---|---|
| 0 | $1.5 \times 10^3$ | 50 | >4 days. |
| 2 | $3.3 \times 10^3$ | 20 | ≅5 min. |

EXAMPLE 21

Five grams of Dianin's compound was melted in an aluminum dish on top of a hot plate. The cup was then removed from the hot plate and phenyl isocyanate (0.87 g.) was added to the liquid melt. The resulting liquid began to crystallize in approximately 1.5 min. and was a solid in about 5 min. The resulting off-white solid material was ground in a mortar and then sucked on a vacuum pump for 2 hrs. The resulting solid was then beat with water in a Waring Blendor for 5 min., filtered, washed, and dried to give 4.77 g. of a white solid, M.P. 146–151° C. Titration showed a 94% filling of the theoretically available "rooms." Infrared analysis showed very little urethane or urea adsorption and a very strong isocyanate absorption, verifying the product as an enclathrated isocyanate.

EXAMPLE 22

The morpholine salt of bis(prefluoromethylsulfonyl) methane (0.03 g.) was dissolved in 3.0 g. of ERL-4289 epoxy. In this solution was dispersed 0.2 g. of the Dianin's clathrate of m-chlorophenylisocyanate prepared as in Example 21 containing 0.49 mmoles isocyanate/gram clathrate. This sample and a control sample using only morpholine salt and epoxy resin were placed in a 140° C. oven and observed as shown below.

TABLE IX

| Observation time, min. | Control sample | Sample with added clathrate |
|---|---|---|
| 0.2 | Liquid | Gelled. |
| 0.6 | do | Solid cured resin. |
| 2.0 | Partial gel | Removed from oven. |
| 2.8 | Complete gel | |
| 3.7 | Semi-solid removed from oven | |
| 10.0 [1] | Partially cured, tacky, cheesy material, quite soft. | Hard, brittle, cured resin. |

[1] Cooled to room temperature.

EXAMPLE 23

In a 10 g. portion of ERL-4221 epoxy resin containing 3.75 phr. of guanidine salt of bis(perfluoromethylsulfonyl) methane was dissolved 0.027 g. of 2,6-dimethylphenyl carbanilate (a blocked isocyanate or urethane). Small portions (1.5 g.) of this mixture were placed in a circulating air oven at 160° C. and heated for various times to determine the cure time. This composition cured to a hard brittle non-tacky solid having a pencil hardness of HB in 14 min. Compositions as above where the concentration of the guanidine salt was varied from 1.6–4.4% by weight and the urethane was varied from 1.6 to 4.4% by weight were heated at temperatures from 122° C. to 178° C., and the cure times were found to range from 10 min. to 210 min.

EXAMPLE 24

In a similar fashion as in Example 23, 2-(t-butyl)-6-methylphenyl carbanilate was substituted for the carbanilate used in Example 23. Over the range of salt concentration of 1.6–4.4% by weight of resin, urethane concentration of 1.6–4.4% by weight and cure temperatures of 122–178° C., cure times to HB pencil hardness were found to range from 15–360 min.

EXAMPLE 25

Bis[3 - (t-butyl) - 5 - methyl-2-(phenylcarbamoyloxy) phenyl]methane was substituted for the carbanilate used in Example 23 and over the same ranges of guanidine salt, carbanilate and cure temperature, cure times of 10–345 min. were obtained.

EXAMPLE 26

To demonstrate the latency of the various compositions of Examples 23, 24 and 25, samples were prepared having the same guanadine salt and blocked isocyanate concentrations as in those examples. The samples were sealed in Gardner viscosity tubes and the change in viscosity monitored as a function of time in the oven at 50° C. Results obtained are shown in Table X.

TABLE X

| Urethane used | Days at 50° C. | Range of Gardner viscosity of samples (catalyst concentration ranges noted above) |
|---|---|---|
| Same as Example 23 | 0 | R to U. |
| | 11 | T to U. |
| | 20 | T to W. |
| | 33 | U to Z. |
| | 48 | X to Z-6. |
| | 63 | Y to Z-10. |
| Same as Example 24 | 0 | T to V. |
| | 13 | Do. |
| | 26 | Do. |
| | 43 | U to X. |
| | 69 | V to Z-2. |
| Same as Example 25 | 0 | U to W. |
| | 7 | Do. |
| | 13 | Do. |
| | 23 | U to X. |
| | 49 | V to Z-1. |

This data denotes excellent latent stability for all three systems. An increase in viscosity from T to Z-4 corresponds to approximately a 10-fold increase of the viscosity in stokes, i.e. T=6.2 stoke and Z-4=63.4 stoke.

EXAMPLE 27

To 10.0 g. portions of a stock solution of guanidine salt of $(CF_3CO_2)_2CH_2$ (0.1 phr.) in ERL-4221 epoxy resin was added the urethanes (phenyl carbanilates) noted in Table XI in amounts varying from 3 phr. to 0.1 phr. The solutions were then run on a Sunshine Gel Time Meter and the gel times determined at 150° C. and compared to the gel time of a control sample of the stock solution which contained no urethane. Data is shown to demonstrate the accelerating effect of the urethanes at a representative concentration and the lowest concentration which when used results in a gel time at 150° C. of less than 30 min.

TABLE XI

| Run: | Urethane accelerator used | Gel time at 150° C. (1 phr.), min. | Lowest conc. giving gel time less 30 min. at 150° C. (phr.) |
|---|---|---|---|
| 1 | None (control) | 123 | |
| 2 | 2,4-bis(phenylcarbomoyloxy)chlorobenzene | 9.2 | 0.2 |
| 3 | Ethyl 4-(phenylcarbamoyloxy)benzoate | 13.2 | 0.2 |
| 4 | p-Chlorophenylcarbamoyloxybenzene | 17.6 | 0.5 |
| 5 | p-Bromophenyl carbanilate | 15.2 | 0.3 |
| 6 | p-Acetylphenyl carbanilate | 10.8 | 0.2 |
| 7 | m-Chlorophenylcarbamoyloxybenzene | 18.3 | |
| 8 | p-Chlorophenyl carbanilate | 12.2 | 0.2 |

Various modifications and alterations of this invention will become apparent to those skilled in the art without departing from the scope and spirit of this invention, and it should be understood that this invention is not to be unduly limited to the illustrative embodiment set forth herein.

We claim:

1. The process comprising contacting cationic sensitive monomer with bis(perfluoroalkylsulfonyl)methane to effect cure thereof, said alkyl having 1 to 18 carbon atoms, said monomer being selected from the class consisting of vicinal epoxides, vinyl ethers, N-vinyl compounds, aziridines, and acetals.

2. The process according to claim 1, wherein said bis(perfluoroalkylsulfonyl)methane has the formula $$(R_fSO_2)_2CHR$$

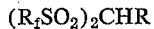

where $R_f$ is perfluoroalkyl, R is H, Br, Cl, alkyl, aryl, alkaryl or —R'—Y, where R' is alkylene and Y is —OH, —CH=CH$_2$, —COOH, Br, Cl, or $$-O-C(O)-C(R'')=SH_2$$

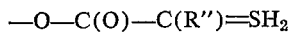

where R'' is H or —CH$_3$.

3. The process according to claim 1, wherein said bis(perfluoroalkylsulfonyl)methane is $(CF_3SO_2)_2CH_2$.

4. The process according to claim 1, wherein said bis(perfluoroalkylsulfonyl)methane is an amino or ammonium salt and said cure is effected (1) at elevated temperature, (2) in the presence of an activator for said salt, or (3) at elevated temperature and in the presence of said activator.

5. The process according to claim 1, wherein said bis(perfluoroalkylsulfonyl)methane is an amino salt and said cure is effected by adding an isocyanate.

6. The process according to claim 1, wherein said bis(perfluoroalkylsulfonyl)methane is an amino salt and said cure is effected by adding a blocked isocyanate or a clathrated isocynate and heating at elevated temperature.

7. The process according to claim 1, wherein said bis(perfluoroalkylsulfony)methane is a clathrate and said cure is effected (1) by adding a solvent for the host component of said clathrate (2) at elevated temperature, or (3) by adding said solvent and effecting said cure at elevated temperature.

8. The process comprising admixing cationic sensitive vicinal epoxide with an amino salt of bis(perfluoromethylsulfonyl)methane and heating the resultant mixture to effect cure of said epoxide.

9. The process according to claim 8, wherein said salt is a guanidine salt.

10. The process according to claim 8, further comprising admixing said mixture of epoxide and salt with a blocked isocyanate.

11. The process according to claim 8, wherein said salt is a guanidine salt and said mixture contains in addition a phenyl carbanilate.

12. The process according to claim 8, further comprising applying or shaping said mixture prior to said heating to effect said cure.

13. A composition comprising a mixture of a latent form of bis(perfluoroalkylsulfonyl)methane and a cationic sensitive monomer, said alkyl having 1 to 18 carbon atoms and said monomer being selected from the class consisting of vicinal epoxides, vinyl ethers, N-vinyl compounds, aziridines, and acetals.

14. The process according to claim 1 wherein said cationic sensitive monomer is a cycloaliphatic vicinal epoxide.

References Cited

UNITED STATES PATENTS 2,924,580  2/1960  Phillips et al. _____ 260—2 EpC
3,281,472  10/1966  Heine _____ 260—543 F WILLIAM H. SHORT, Primary Examiner T. E. PERTILLA, Assistant Examiner U.S. Cl. X.R.

117—127, 161 ZB; 260—2 A, 2 EN, 47 EC, 59, 67 FP, 78 R, 78.4 Ep, 79.7, 88.3 A, 88.3 R, 91.1 M, 94.4, 611 B, 613 B, 830 TW

UNITED STATES PATENT OFFICE
CERTIFICATE OF CORRECTION

Patent No. 3,632,843　　　　　　Dated January 4, 1972

Inventor(s) Michael George Allen, and George W. Beebe

It is certified that error appears in the above-identified patent and that said Letters Patent are hereby corrected as shown below:

Column 2, line 15, formula should read

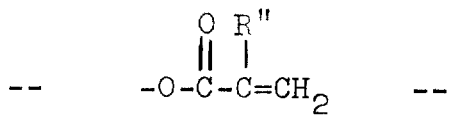

Column 3, line 3 "is" should read -- in --.

Column 5, line 49, formula should read

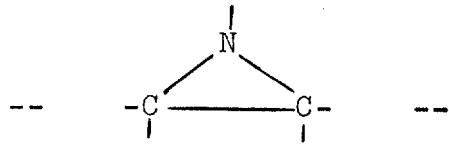

Column 6, line 10 "or" should read -- of --.

Column 7, line 26, "carbonyloxy" should read -- carbamoyloxy --

Column 13, line 33, "composition" should read -- compositions --

Column 15, line 2 the formula should read

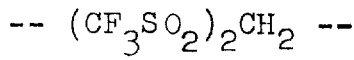

line 53, claim 2, formula should read
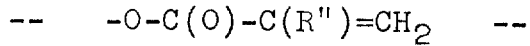

Signed and sealed this 18th day of July 1972.

(SEAL)
Attest:

EDWARD M. FLETCHER, JR.　　　　ROBERT GOTTSCHALK
Attesting Officer　　　　　　　　Commissioner of Patents

UNITED STATES PATENT OFFICE
CERTIFICATE OF CORRECTION

Patent No. 3,632,843         Dated 1-4-72

Inventor(s) Michael George Allen and George W. Beebe

It is certified that error appears in the above-identified patent and that said Letters Patent are hereby corrected as shown below:

Column 2, Line 60, "(FN 25,974)" should read -- SN 807,409

Column 6, Line 57-58 "presentatively" should read -- representatively

Signed and sealed this 31st day of October 1972.

(SEAL)
Attest:

EDWARD M. FLETCHER, JR.
Attesting Officer

ROBERT GOTTSCHALK
Commissioner of Patents